(12) United States Patent
Grabon

(10) Patent No.: US 11,747,065 B2
(45) Date of Patent: Sep. 5, 2023

(54) REFRIGERANT LEAK DETECTION SYSTEM AND METHOD

(71) Applicant: Carrier Corporation, Palm Beach Gardens, FL (US)

(72) Inventor: Michel Grabon, Bressolles (FR)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 17/900,945

(22) Filed: Sep. 1, 2022

(65) Prior Publication Data

US 2022/0412625 A1 Dec. 29, 2022

Related U.S. Application Data

(62) Division of application No. 17/003,087, filed as application No. PCT/IB2018/000283 on Feb. 27, 2018, now Pat. No. 11,441,827.

(51) Int. Cl.
*F25B 49/02* (2006.01)

(52) U.S. Cl.
CPC ........ *F25B 49/02* (2013.01); *F25B 2500/222* (2013.01); *F25B 2600/01* (2013.01);
(Continued)

(58) Field of Classification Search
CPC ............ F25B 2500/222; F25B 2600/01; F25B 2600/0253; F25B 2700/195; F25B 2700/197; F25B 49/02
See application file for complete search history.

(56) References Cited

U.S. PATENT DOCUMENTS 4,549,404 A * 10/1985 Lord ....................... F25B 49/02
62/224
4,966,013 A 10/1990 Wood
(Continued)

FOREIGN PATENT DOCUMENTS

CN 204787070 U 11/2015
CN 107142251 A 9/2017
(Continued)

OTHER PUBLICATIONS

Chinese Office Action Issued in Chinese Application No. 201880090300 dated Jul. 20, 2021; 5 Pages.
(Continued)

*Primary Examiner* — Henry T Crenshaw
(74) *Attorney, Agent, or Firm* — CANTOR COLBURN LLP

(57) ABSTRACT

Disclosed is a system for detecting a refrigerant leak in a refrigeration system, wherein a system controller is configured to: execute leak test cycles that include executing a first phase (T1-T2) of transferring refrigerant charge to the evaporator, a second phase (T2-T3) of transferring refrigerant charge to the condenser, and a third phase (T3-T4) of transferring refrigerant charge to the evaporator, determine a reference leak detection cycle time (LDCTREF) by determining a time from a beginning of the second phase (T2) in a first test to an end of the third phase (T4) in the first test, and setting LDCTREF to the time, determine a second leak detection cycle time (LDCT2nd) by determining a time from a beginning of the second phase (T2) in the second test to a (Continued)

second end of the third phase (T4) in the second test, and setting LDCT2nd to the time, determine if a refrigerant leak exists, and communicate the determination.

10 Claims, 10 Drawing Sheets

(52) U.S. Cl.
CPC . *F25B 2600/0253* (2013.01); *F25B 2700/195* (2013.01); *F25B 2700/197* (2013.01)

(56) References Cited

U.S. PATENT DOCUMENTS

| | | | |
|---|---|---|---|
| 5,303,562 | A | 4/1994 | Bahel et al. |
| 5,307,642 | A | 5/1994 | Dean |
| 6,035,651 | A | 3/2000 | Carey |
| 6,293,114 | B1 | 9/2001 | Kamemoto |
| 6,619,057 | B2 | 9/2003 | Williamson et al. |
| 7,159,408 | B2 | 1/2007 | Sadegh et al. |
| 7,506,518 | B2 | 3/2009 | Mizutani et al. |
| 9,062,903 | B2 | 6/2015 | Sjoholm et al. |
| 9,488,399 | B2 | 11/2016 | Kanazawa et al. |
| 9,568,227 | B2 * | 2/2017 | Douglas ................. F25B 49/02 |
| 2005/0103029 | A1 | 5/2005 | Kawahara et al. |
| 2015/0219376 | A1 * | 8/2015 | Douglas ................. F25B 49/02 |
| | | | 62/126 |
| 2017/0219263 | A1 | 8/2017 | Schmidt et al. |
| 2020/0309434 | A1 * | 10/2020 | Walser ................. F25B 49/005 |
| 2021/0199359 | A1 * | 7/2021 | Grabon ................. F25B 49/02 |

FOREIGN PATENT DOCUMENTS

| | | |
|---|---|---|
| EP | 1970651 A1 | 9/2008 |
| EP | 2257749 B1 | 12/2010 |
| EP | 2302309 A1 | 3/2011 |
| EP | 3115714 A1 | 1/2017 |
| JP | 4098061 A | 3/1992 |
| WO | 2008035418 A1 | 3/2008 |
| WO | 2015056704 A1 | 4/2015 |
| WO | 2017006474 A1 | 1/2017 |

OTHER PUBLICATIONS

International Preliminary Report on Patentability Issued in International Application No. PCT/IB2018/000283 dated Sep. 3, 2020; 6 Pages.

International Search Report Issued in International Application No. PCT/IB2018/000283 dated Jul. 11, 2018; 2 Pages.

* cited by examiner

REFRIGERANT LEAK DETECTION SYSTEM AND METHOD

CROSS REFERENCE TO RELATED APPLICATIONS

This application is a division of U.S. Non-Provisional application Ser. No. 17/003,087, filed Aug. 26, 2020, which is a 371 National Stage of PCT/IB2018/000283, filed on Feb. 27, 2018, which is incorporated by reference herein in its entirety.

BACKGROUND

Exemplary embodiments pertain to the art of maintenance of a refrigeration systems and more specifically to a system and method for detecting a refrigerant leak in a refrigeration system.

There are two typical methods of detecting a refrigerant leak in refrigeration unit. A first method may be detecting leaking gas in a space surrounding the refrigeration unit. This method may be limited due to air movement around units and positions of gas sensors. In outdoor situations, this method may be very inaccurate. A second method may apply analytics of operational parameters such as pressures and temperatures within the unit. Inaccurate modeling and non-steady state operation of the units may make this method inaccurate and ineffective until as much as 20% of total refrigerant charge is depleted.

BRIEF DESCRIPTION

Disclosed is a system for detecting a refrigerant leak in a refrigeration system, the refrigeration system including a refrigerant charge, an evaporator, a condenser and a system controller, wherein the controller is configured to: execute a plurality of leak test cycles, including a first leak test cycle and a second leak test cycle, each of the plurality of leak test cycles comprising executing a first phase of transferring the refrigerant charge to the evaporator, executing a second phase of transferring the refrigerant charge to the condenser, and executing a third phase of transferring the refrigerant charge to the evaporator, determine a reference leak detection cycle time (LDCTREF) by determining a first time from a first beginning of the second phase in the first leak test cycle to a first end of the third phase in the first leak test cycle, and setting LDCTREF to the first time, determine a second leak detection cycle time (LDCT2nd) by determining a second time from a second beginning of the second phase in the second leak test cycle to a second end of the third phase in the second leak test cycle, and setting LDCT2nd to the second time, determine if a refrigerant leak in the refrigeration system exists if LDCT2nd is shorter in duration than LDCTREF, and communicate an existence of the refrigerant leak with an alert which is one or more of visual, audible, and vibratory.

In addition to one or more of the above disclosed features, or as an alternative, the first phase initiates with the controller taking the refrigeration system off line.

In addition to one or more of the above disclosed features, or as an alternative, the third phase concludes with the control bringing the refrigeration system on line.

In addition to one or more of the above disclosed features, or as an alternative, the controller periodically performs one of the plurality of leak detection test cycles.

In addition to one or more of the above disclosed features, or as an alternative, the controller performs the one of the plurality of leak detection test cycles following a non-periodic trigger event.

In addition to one or more of the above disclosed features, or as an alternative, the trigger event includes the controller bringing the refrigeration system off line for maintenance.

In addition to one or more of the above disclosed features, or as an alternative, the refrigeration system includes a variable speed compressor and an electronic expansion valve (EXV), and wherein the first phase starts at time T1 and ends at time T2 as monitored by the controller, and throughout the first phase the controller sets the compressor to minimum output and the EXV to maximum opened, and the controller monitors pressure in at least one of the condenser and evaporator to determine when the evaporator is charged with the system refrigerant and the compressor is empty of system refrigerant.

In addition to one or more of the above disclosed features, or as an alternative, the second phase starts at time T2 and ends at time T3 as monitored by the controller, and throughout the second phase the controller sets the compressor to no output and sets the EXV to closed, and the controller monitors pressure in at least one of the condenser and evaporator to determine when the condenser is charged with the system refrigerant and the evaporator is empty of system refrigerant.

In addition to one or more of the above disclosed features, or as an alternative, the third phase starts at time T3 and ends at time T4 as monitored by the controller, and throughout the third phase the controller sets the compressor to no output and sets the EXV to maximum opened, and the controller monitors pressure in at least one of the condenser and evaporator to determine when the evaporator is charged with the system refrigerant and the compressor is empty of system refrigerant.

In addition to one or more of the above disclosed features, or as an alternative, the controller monitors evaporator suction pressure to determine when the evaporator is empty of system refrigerant.

Further disclosed is a method for detecting a refrigerant leak in a refrigeration system that includes one or more of the above disclosed features.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

According to an embodiment, an approach to detect refrigerant leak is provided that is based on an automated transient process for operating a refrigeration circuit. In a disclosed mode of operation, a first amount of refrigerant present inside the refrigeration circuit may be estimated, where the estimate is relatively accurate compared with typical commercially practiced methods. By benchmarking the first amount as a normal amount of refrigerant, an estimation of a later amount of refrigerant in the same circuit may provide for a detection of a missing fraction of the refrigerant in the circuit.

Figure 1:
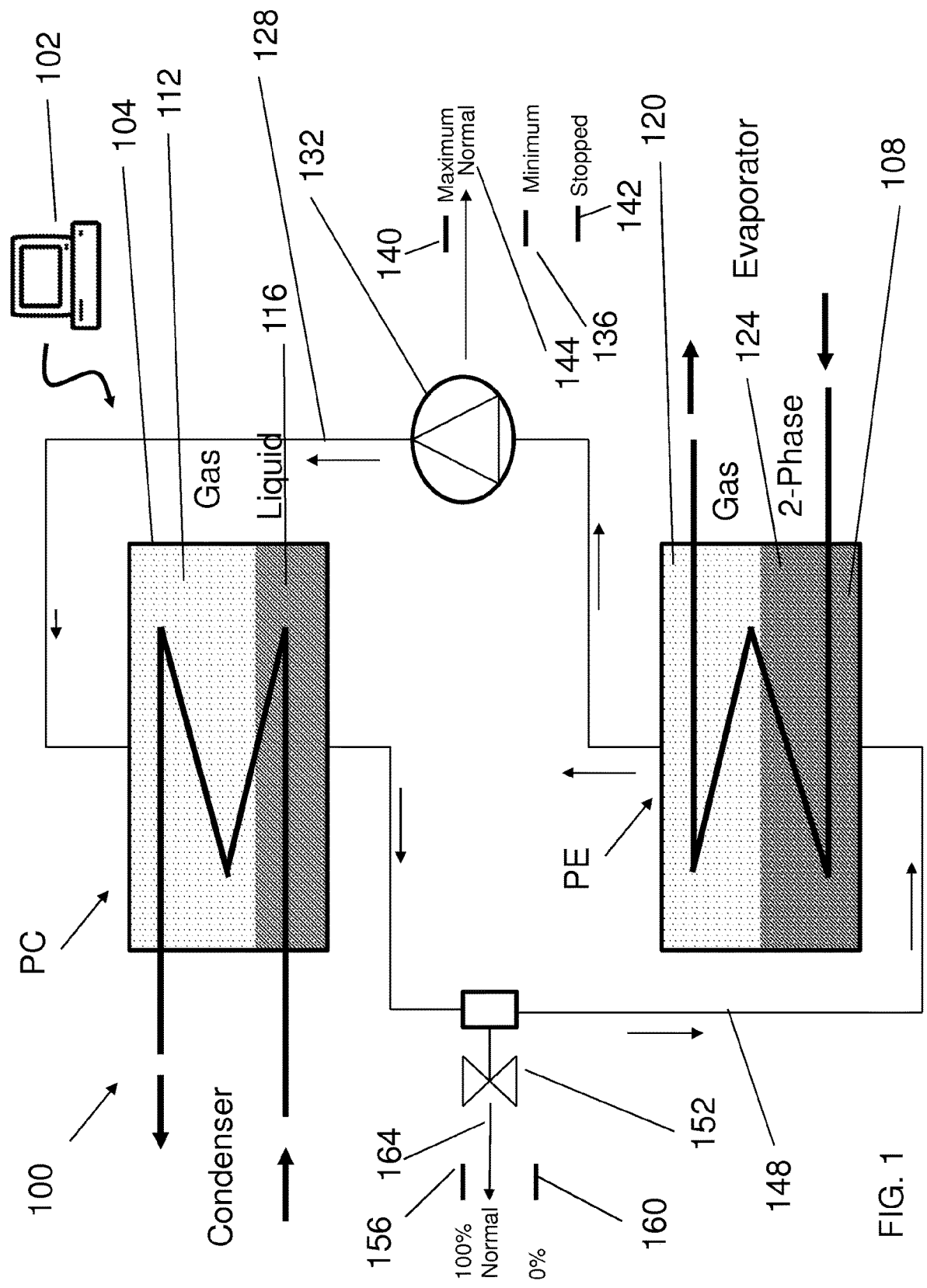
FIG. 1 illustrates features of a disclosed embodiment.

Turning to FIG. 1, a refrigerant circuit 100 is illustrated in a normal operational mode, where the operational mode is controlled by a controller 102. The refrigerant circuit includes a condenser 104 and an evaporator 108 disposed below the condenser. During operation, the condenser may have a first portion of the refrigerant in the system which includes a first gas portion 112 and a first liquid portion 116. At the same time the evaporator may have a second portion of the system refrigerant including a second gas portion 120 and a second liquid portion 124.

A first fluid path 128 with a compressor 132 fluidly connects the condenser with the evaporator. In the first path, refrigerant may flow from the evaporator to the condenser by action of the compressor. For purposes of this disclosure, the compressor, which is a variable capacity compressor, may operate in a range between a minimum output state 136 and a maximum output state 140 and the compressor may also be in a stopped or idle state 142. In some cases several compressors operating in parallel may operate in a same refrigerant circuit.

A second path 148 with an electronic expansion valve (EXV) 152 also connects the condenser with the evaporator. In the second path, refrigerant may flow from the condenser to the evaporator by action of a pressure differential between condenser and evaporator and a flow of refrigerant is controlled by action of the EXV. The EXV may operate in a range between a maximum opened state 160 and a closed state 156, illustrated respectively as 100% closed and 0% opened. The EXV may operate in a first EXV state 164, which may be one of many normal states between the closed state 160 and the maximum opened state 156.

Figure 9:
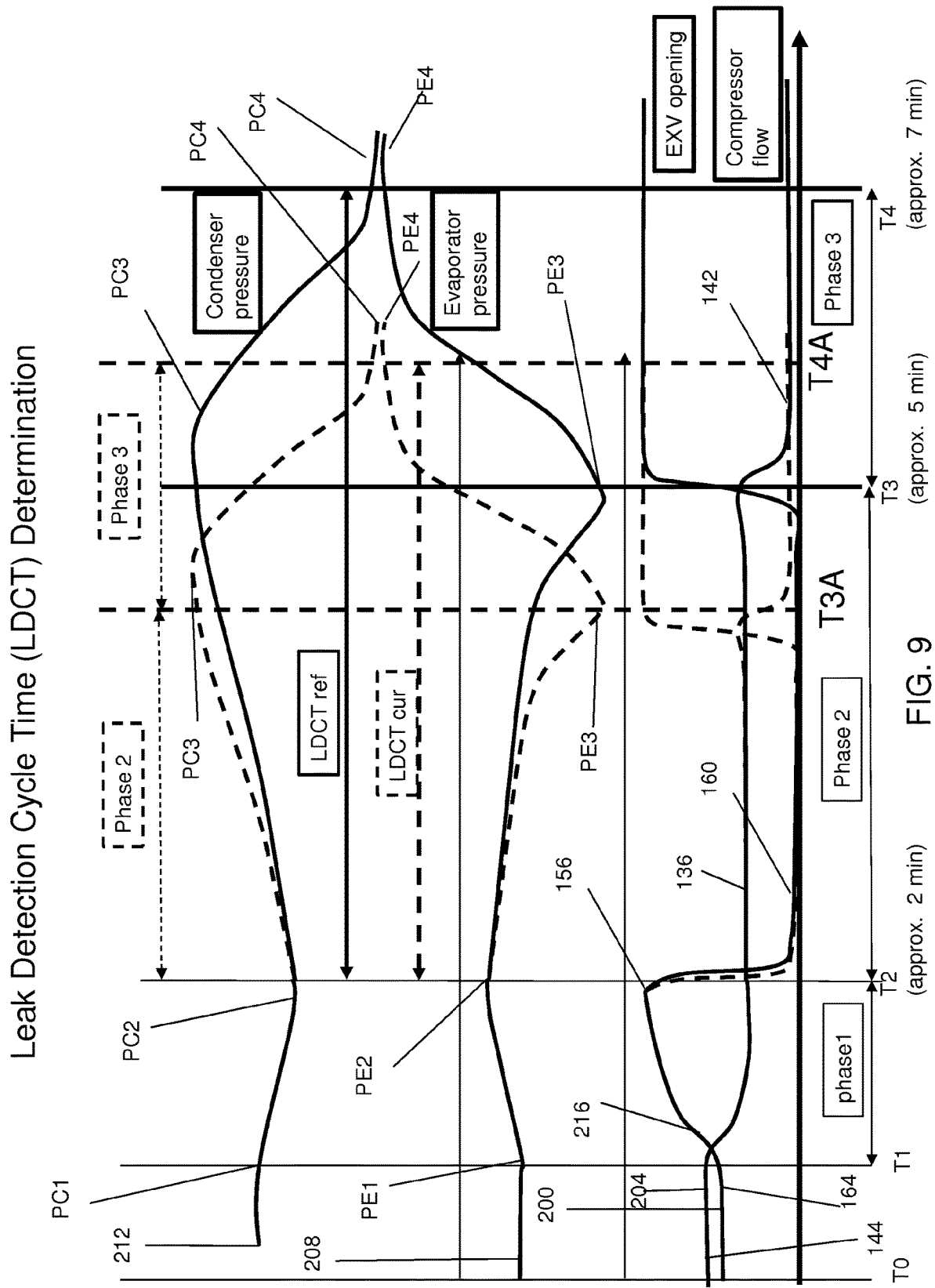
FIG. 9 illustrates features of a disclosed embodiment.

The disclosed embodiments may create an artificial transient mode of operation for estimating refrigerant charge. This mode of operation may be divided into various phases. As illustrated in FIG. 9, with T0-T4 representing time, curve 200 may represent the operation of the EXV, curve 204 may represent the operation of the compressor, curve 208 may represent the pressure in the evaporator, and curve 212 may represent pressure in the compressor. T0-T1 may represent the operation of the system prior to running a leakage test, and T1-T4 may represent the operation of the system during a leakage test. More specifically, T1-T2 may represent the operation of the system during the first phase of the leakage test, T2-T3 may represent the operation of the system during the second phase of the leakage test, and T3-T4 represents the operation of the system during the third phase of the leakage test.

Referring to FIGS. 1 and 9, during normal operation, between time T0 and T1, the compressor may be running in the first compressor state 144, the EXV may be operating in the first EXV state 164, pressure in the evaporator PE may remain approximately PE1 and pressure in the condenser PC may remain approximately PC1. During normal use, the flow rate of refrigerant may be substantially constant in all components.

Figure 2:
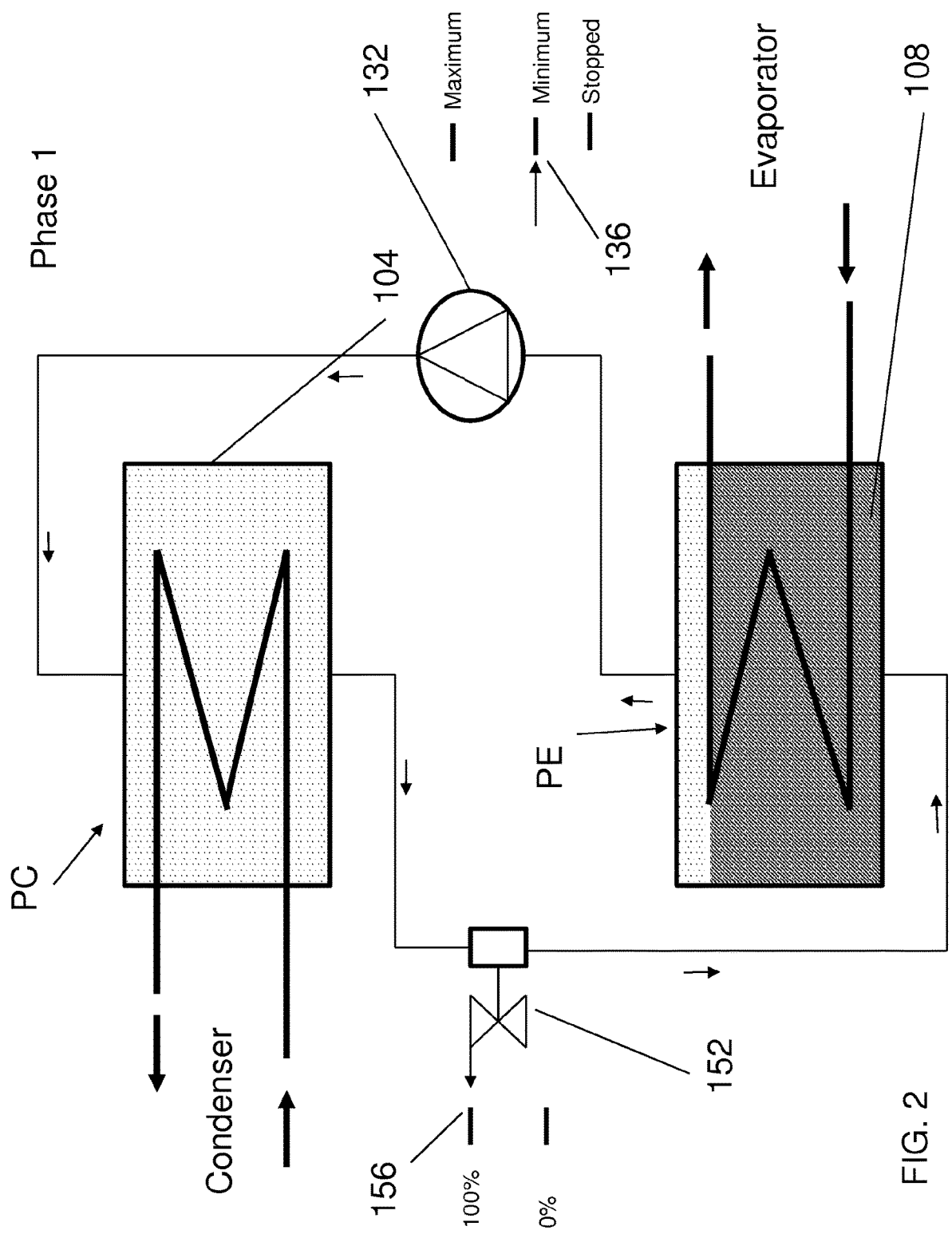
FIG. 2 illustrates features of a disclosed embodiment.
Figure 7:
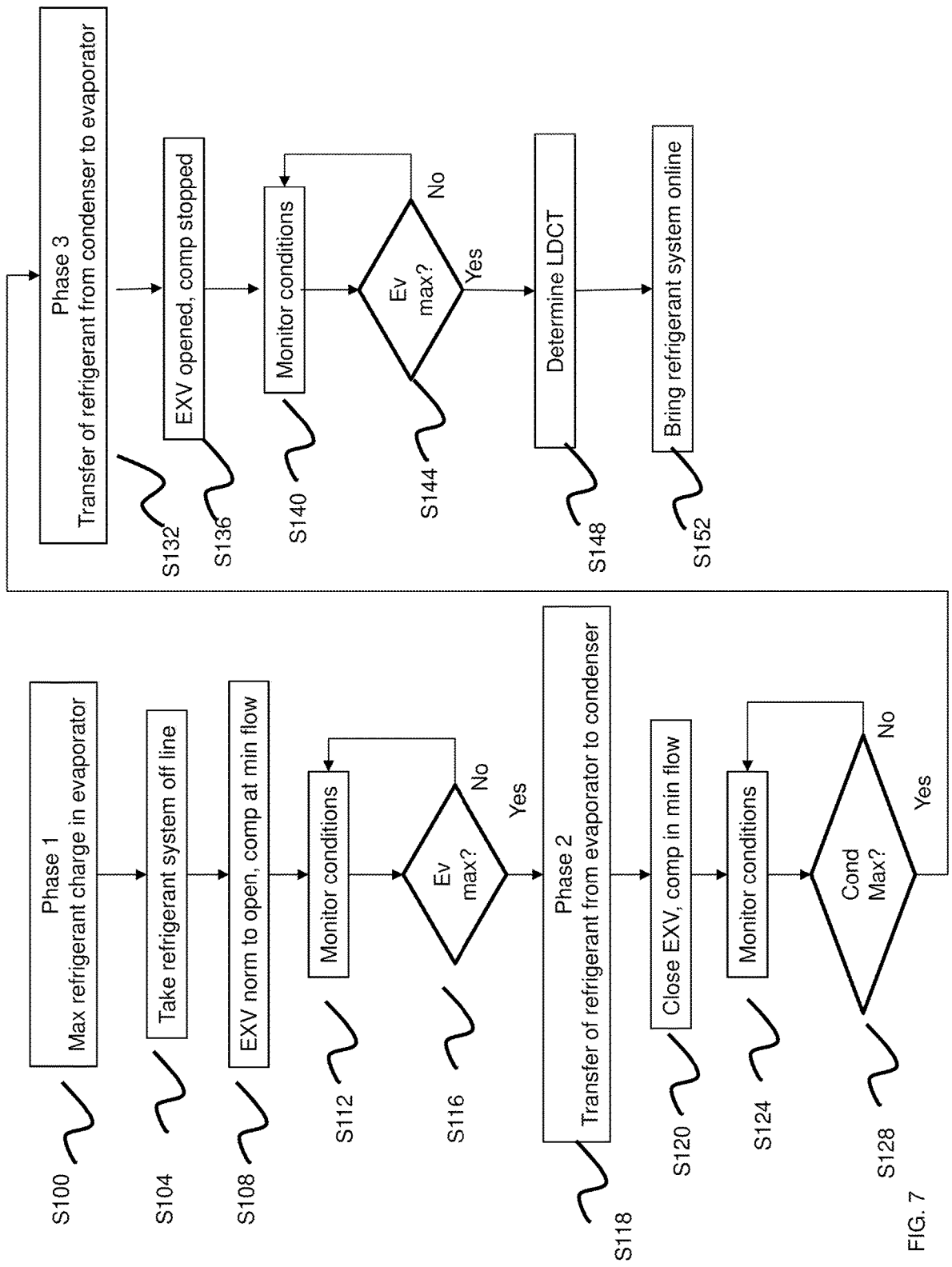
FIG. 7 illustrates features of a disclosed embodiment.

Referring to FIGS. 2, 7 and 9, during the first phase, a maximum amount of system refrigerant may be delivered to the evaporator. Specifically, at step S100 and time T1, the controller may initiate the first phase. At step S104 and time T1, the controller may take the system off line so as to not interfere with active cooling cycles. At step S108 and time T1, the EXV may be opened to the maximum opened state 156 and the compressor capacity (volumetric flow) may be brought to the minimum output 136. At step S112 and between time T1 and time T2, that is, throughout the first phase, the controller may monitor refrigerant conditions. During this time, the controller may also perform step S116 of determining whether a maximum amount of available refrigerant is disposed in the evaporator. At time T2, which may define the end of the first phase, pressure in the condenser may reach PC2 and pressure in the evaporator may reach PE2, and the determination may be "Yes" at step S116. The duration of this phase may be determined by a detection of steady state operation (that is, reaching values of constant pressures in the evaporator and the condenser) or based on a predetermined time duration based on theoretical determinations or prior actual observations (for instance two minutes). In one embodiment, the first phase may take approximately two minutes to complete when the system is fully charged and when not fully changed.

Figure 3:
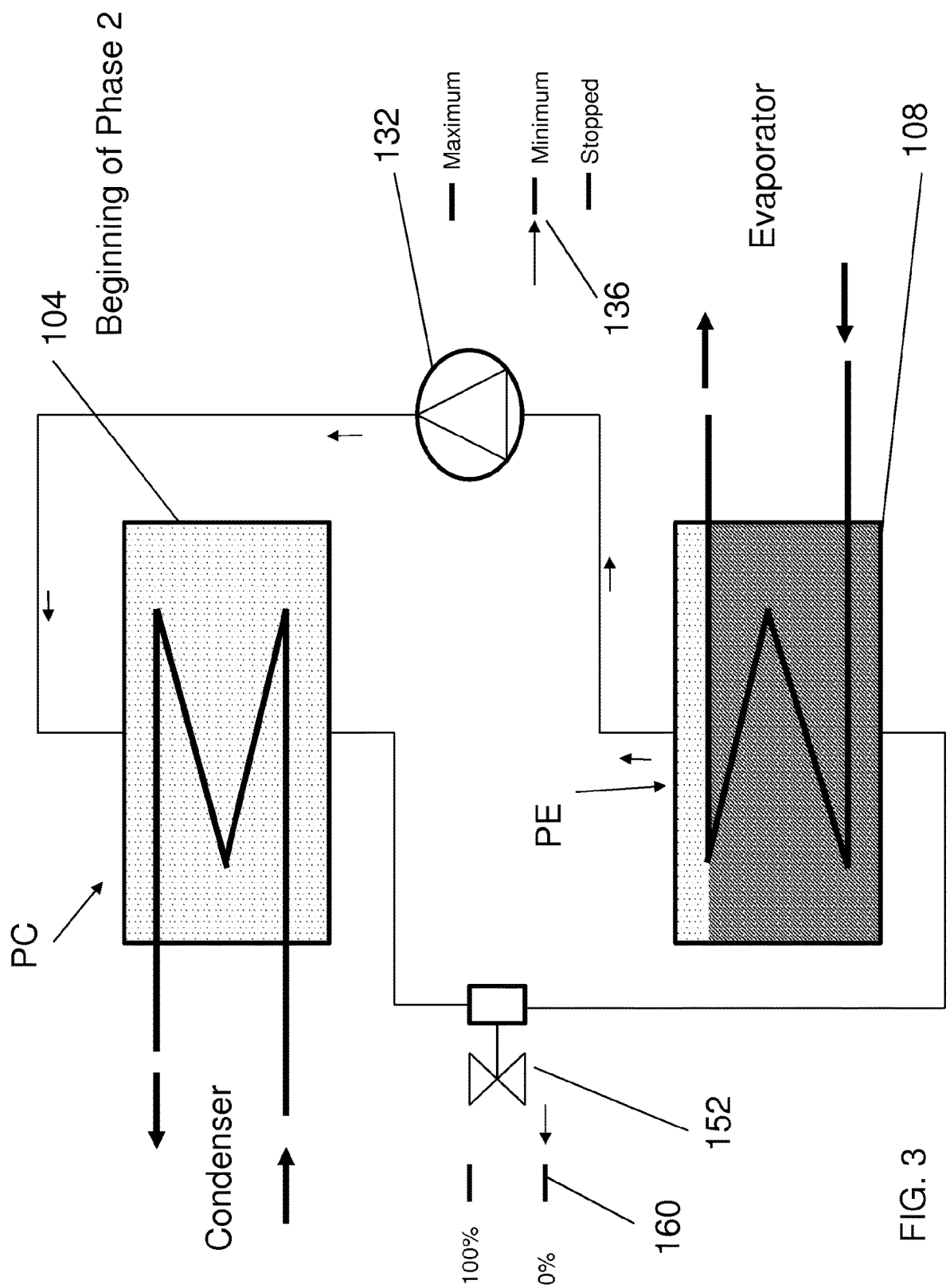
FIG. 3 illustrates features of a disclosed embodiment.
Figure 4:
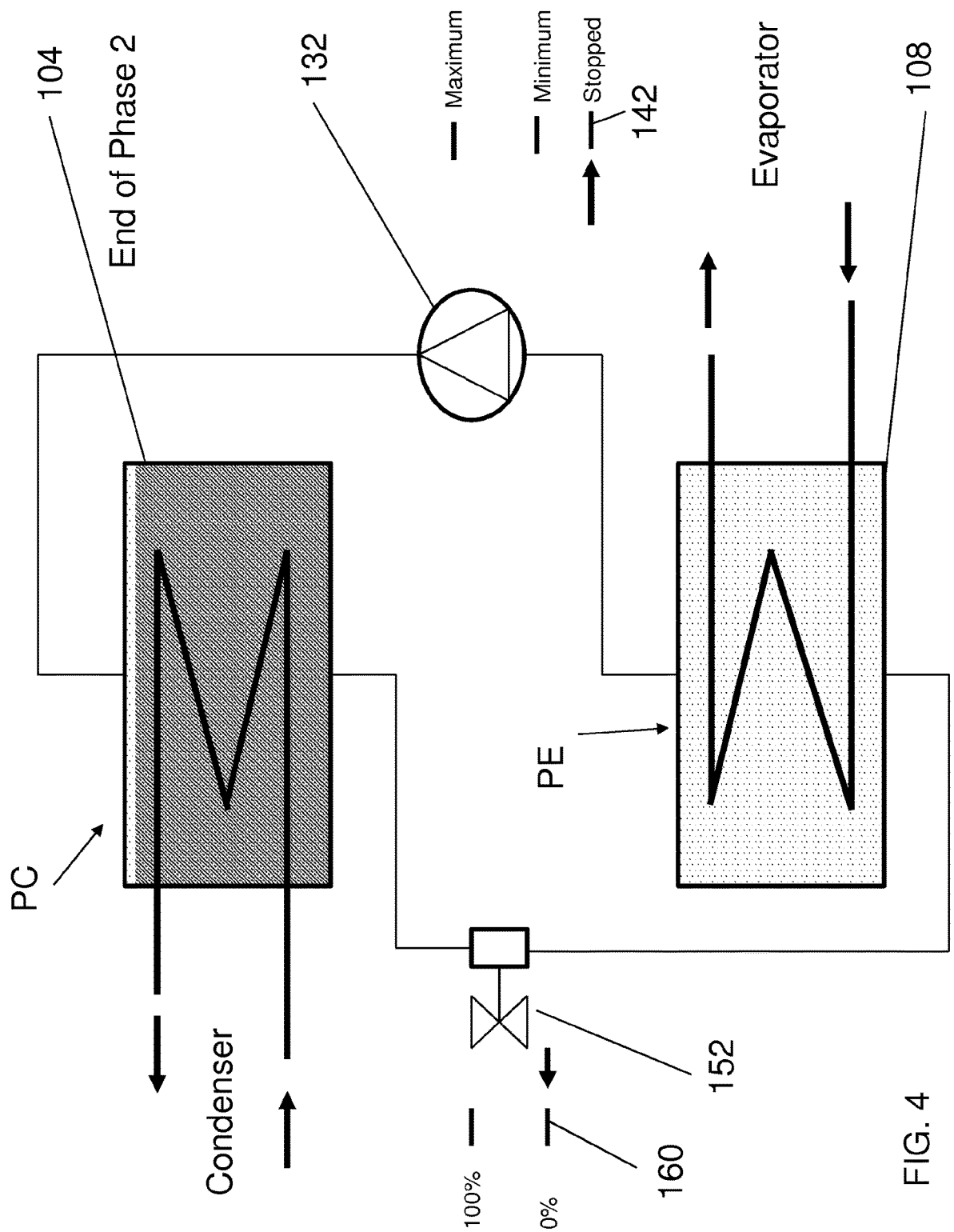
FIG. 4 illustrates features of a disclosed embodiment.
Figure 5:
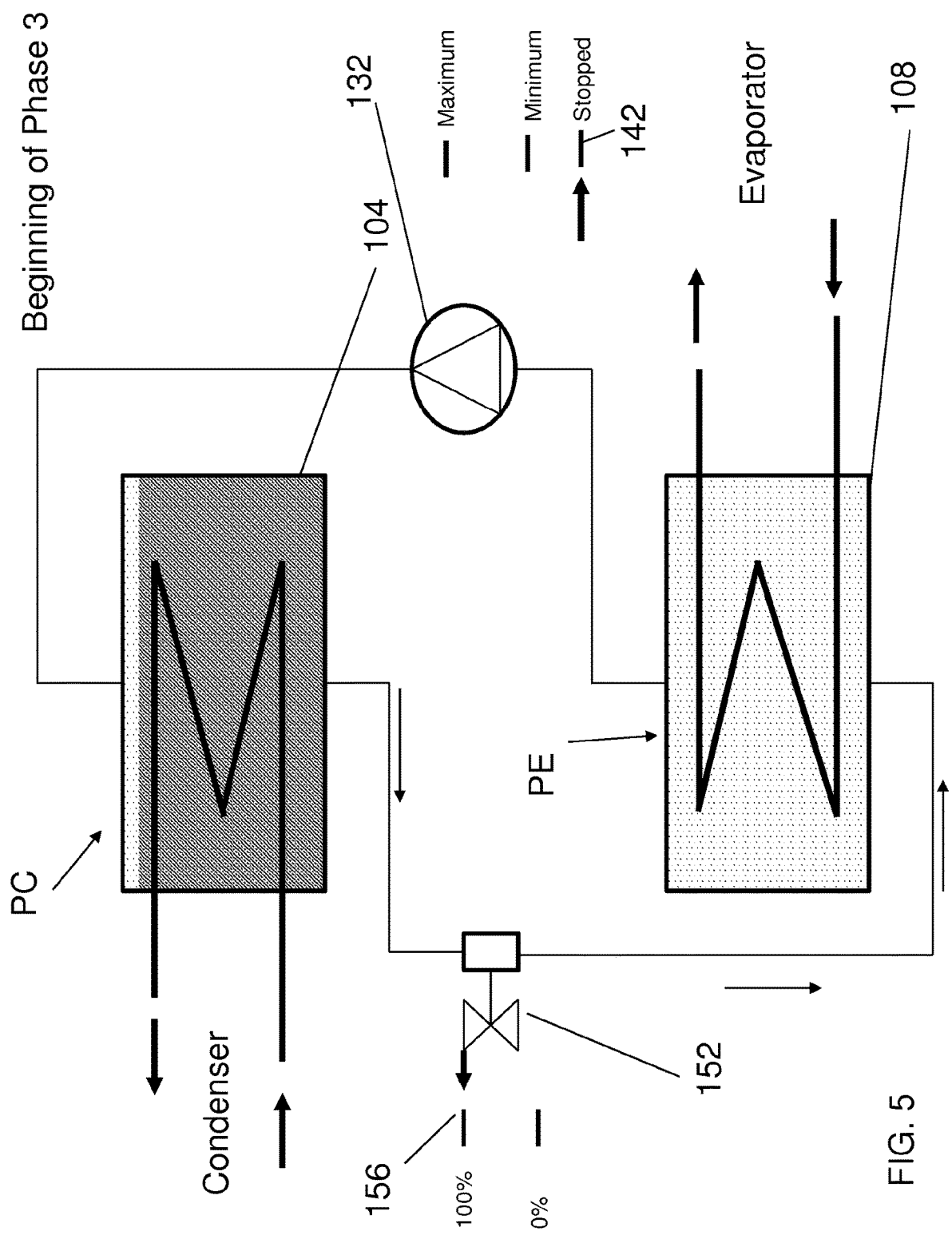
FIG. 5 illustrates features of a disclosed embodiment.
Figure 6:
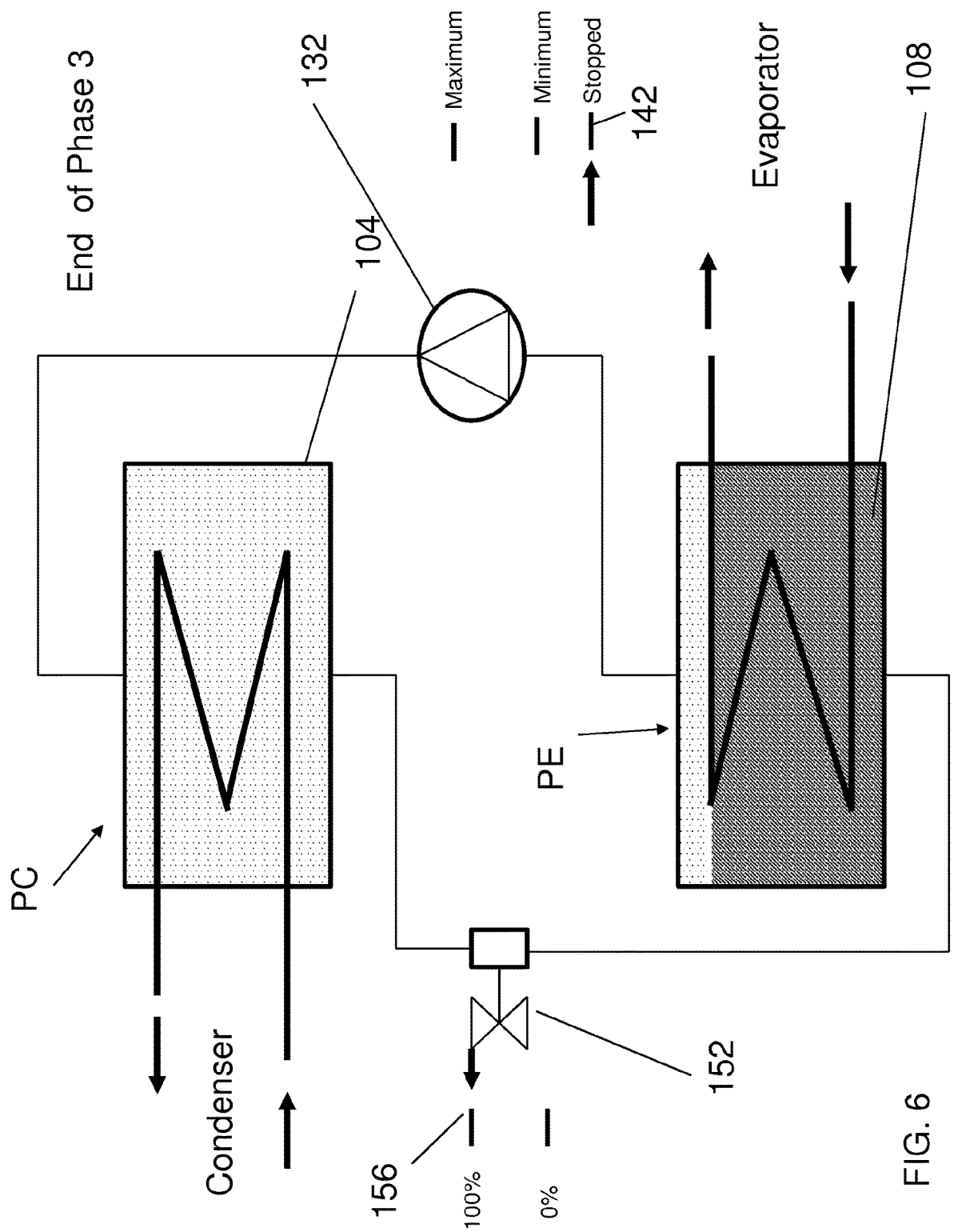
FIG. 6 illustrates features of a disclosed embodiment.

Referring to FIGS. 3, 4, 7 and 9, at step S118 and time T2, the controller may initiate the second phase, which may be transferring the refrigerant from the evaporator to the condenser. At step S120 and T2, the controller may put the EXV in the closed state 160 and put the compressor in the minimum transfer state 136 as illustrated in FIGS. 3 and 9. At step S124 and between time T2 and T2, that is, throughout the second phase, the controller may monitor refrigerant conditions. During this time, the controller may perform step S128 of determining whether a maximum available refrigerant is disposed in the condenser. At time T3, which may define the end of the second phase, pressure in the condenser may reach PC2 and pressure in the evaporator may reach PE2, and the determination may be "Yes" at step S128. In one embodiment, the second phase may take approximately three minutes to complete when the system is fully charged.

In one embodiment, the evaporator suction pressure may be monitored to determine when the evaporator is empty. Moreover, as the compressor provides a constant refrigerant volumetric flow, the time needed to transfer refrigerant from evaporator to condenser (when the EXV is closed) may be a function of an amount of refrigerant stored in evaporator. To better assess the amount of refrigerant transferred during this phase, a real time calculation of refrigerant density may be performed by the controller and this may be taken into account to calculate a mass of refrigerant transferred.

Referring to FIGS. 5-7 and 9, at step S132 and time T3, the controller may initiate the third phase of transferring the refrigerant back to the evaporator. At step S136 and time T2, the controller may place the compressor in the stopped state 142 and place the EXV in the maximum opened state 156. At step S140 and between time T3 and T4, that is, throughout the third phase, the controller may monitor refrigerant conditions. During this time, the controller may perform step S144 of determining whether a maximum available refrigerant is disposed in the evaporator. At time T4, which may define the end of the third phase, pressure in the condenser may reach PC4 and pressure in the evaporator may reach PE4, and the determination may be "Yes" at step S144. In one embodiment, the third phase may take about 2 minutes to complete when the system is fully charged.

As indicated, at the start of the third phase, almost all available refrigerant may be stored in the condenser, which may be mostly liquid at a relatively high pressure, while the evaporator may be at a relatively low pressure. During this phase the EXV may be considered a fixed geometry orifice. Due to the pressure difference, all refrigerant stored in the condenser may flow to the evaporator. The transfer time may be a function of geometry, that is, of the orifice dimension, and the amount of refrigerant transferred. As illustrated, PE4 and PC4 may be substantially equal at time T4.

At step S148 the controller may determine the duration between T2 and T4, that is, the start of the second phase and the end of the third phase. This time may represent the duration of (i) the time needed to transfer refrigerant from evaporator to condenser with the compressor operating at minimum output and with the EXV closed and (ii) the time needed to transfer refrigerant from the condenser back to the evaporator with the compressor stopped and the EVX in a maximum opened state. This time period is the leak detection cycle time (LDCT). At step S152, the controller may put the refrigerant system back online. The LDCT may be based on transfer time corresponding to each phase or may be based on more sophisticated function which will take into account variation of refrigerant density (calculated in real time by controller) during given transfer phase.

Figure 8:
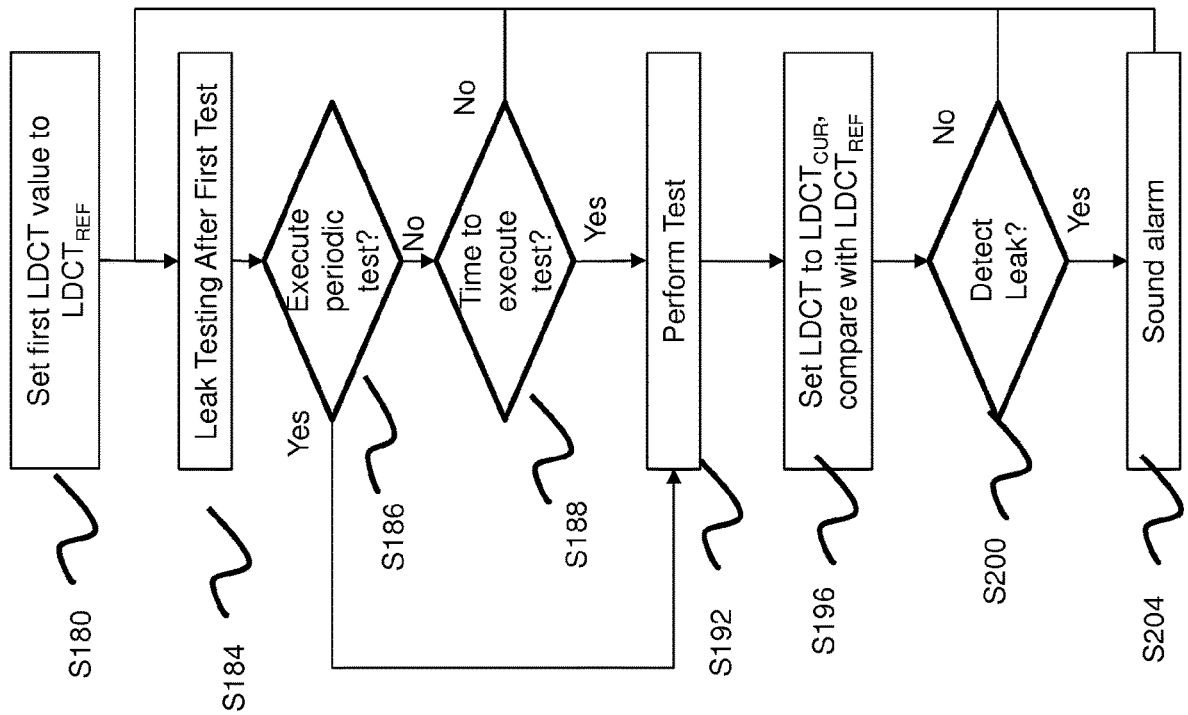
FIG. 8 illustrates features of a disclosed embodiment.

Referencing FIGS. 8 and 9, at step S180 the first LDCT measurement is set by the controller as a reference transfer time (LDCT-REF). This transfer time essentially corresponds to the transfer of the total refrigerant charge between the evaporator and condenser.

At step S184 the controller may perform leak detection testing after the first test. At step S186 the controller may determine whether to perform a periodic test, such as a time of day or week. At step S188 the controller may determine whether to perform a non-periodic leak detection test based on a trigger event. The trigger event could be taking the system off line for a non-critical reason, such as for maintenance, during the normal useful life of the system. The order of executing steps S186 and S188 is not limiting. So long as the controller determines "No" for steps S186 and S188, the system will cycle to determine whether to execute a leak detection test.

Upon determining "Yes" at steps S186 or S188, the controller may execute step S192 of performing a leak detection test, which is repeating the first through third phases. Referencing to FIGS. 8 and 9, if refrigerant is leaked, then during the second phase the condenser will reach pressure PC3 and the evaporator will reach pressure PE3 at time T3A, which is shorter than T3. Similarly, with a leak, during the third phase the condenser will reach pressure PC4 and the evaporator will reach pressure PE4 at time T4A, which is shorter than T4.

At step S196 at time T4, the controller may set the LDCT determined during the immediately preceding cycle as $LDCT_{CUR}$ and compare it with the reference time $LDCT_{REF}$. The controller may also sequentially number each recorded LDCT so that, for example the second recorded LDCT may be recorded by the controller as $LDCT_{2nd}$. If $LDCT_{CUR}$ is less than $LDCT_{REF}$, then a leak has been detected. At step S200 if the controller determines "No", for example, that no leak has been detected, then the controller may cycle back to step S184. Otherwise, if the result of step S200 is "Yes", then at step S204 the system may set off an alert, which may be visual, auditory, and/or vibratory indicating a leak has occurred. In one embodiment the system cycles back to step S184 to continue to test for leaks, the results of which may be indicative of a leak rate when compared with the earlier detection.

Figure 10:
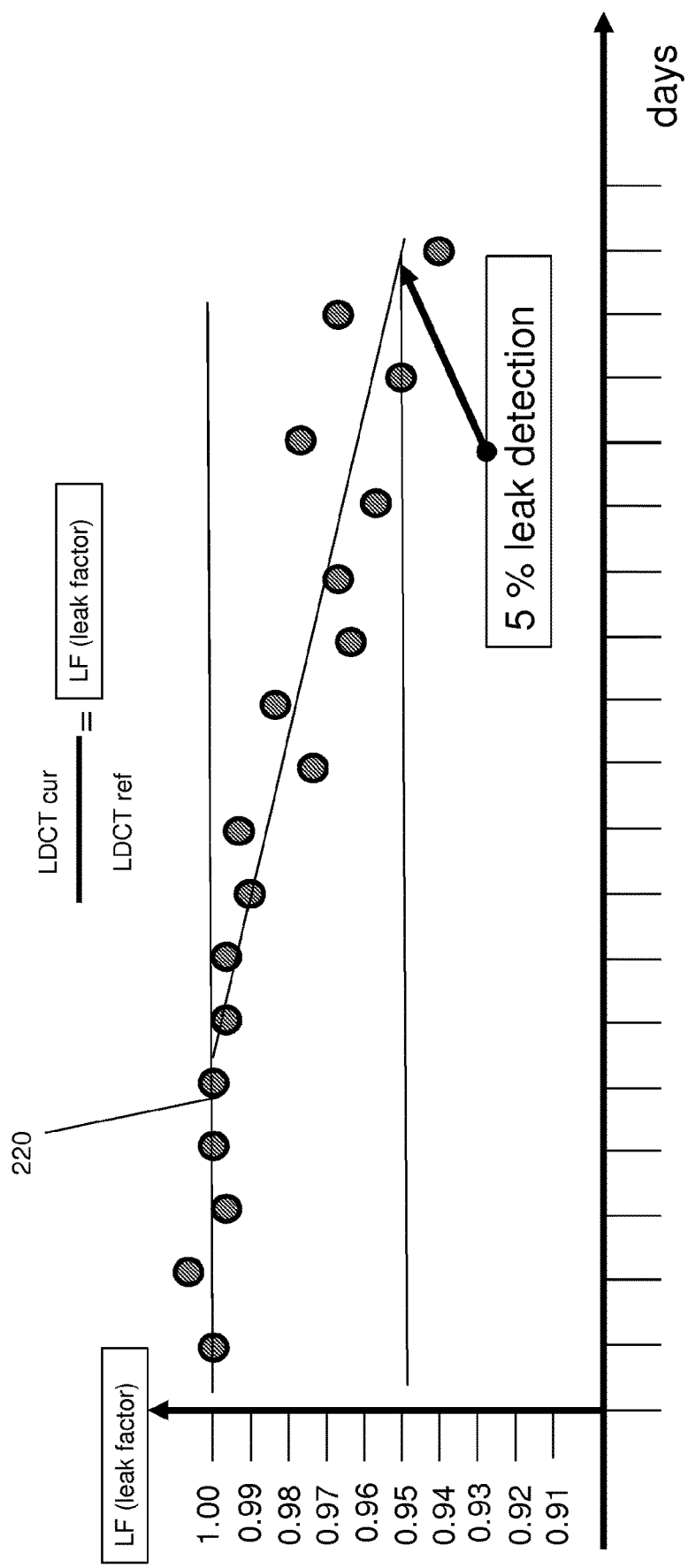
FIG. 10 illustrates features of a disclosed embodiment.

A normal method of detecting leaks in a refrigerant system may not detect leaks until a substantial amount of refrigerant is lost. However, as illustrated in FIG. 10, the disclosed embodiments may detect leaks at for example approximately 5% refrigerant loss. For example, a scatter graph 220 representing a ratio of $LDCT_{CUR}$ to $LDCT_{REF}$ may detect a loss of a few percentages of refrigerant over various days, which as illustrated is 5 percentage points. It is to be appreciated that quickly identifying losses may enable quickly fixing systems and may avoid disruptions and system damage.

The term "about" is intended to include the degree of error associated with measurement of the particular quantity based upon the equipment available at the time of filing the application. The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. In particular only one of the detection phases may be used during the detection process (for instance only phase 2 corresponding to the transfer from the evaporator to the condenser, or only phase 3 corresponding to the transfer from the condenser to the evaporator). Therefore, it is intended that the present disclosure not be limited to the particular embodiment disclosed as the best mode contemplated for carrying out this present disclosure, but that the present disclosure will include all embodiments falling within the scope of the claims.

I claim:

1. A method for detecting a refrigerant leak in a refrigeration system, the refrigeration system including a refrigerant charge, an evaporator, a condenser and a system controller, wherein the controller:

executes a plurality of leak test cycles, including a first leak test cycle and a second leak test cycle, each of the plurality of leak test cycles comprising
executing a first phase of transferring the refrigerant charge to the evaporator,
executing a second phase of transferring the refrigerant charge to the condenser, and
executing a third phase of transferring the refrigerant charge to the evaporator, determines a reference leak detection cycle time by determining a first time from a first beginning of the second phase in the first leak test cycle to a first end of the third phase in the first leak test cycle, and setting the reference leak detection cycle time to the first time, determines a second leak detection cycle time by determining a second time from a second beginning of the second phase in the second leak test cycle to a second end of the third phase in the second leak test cycle, and setting the second leak detection cycle time to the second time, determines if a refrigerant leak in the refrigeration system exists because the second leak detection cycle time is shorter in duration than the reference leak detection cycle time, and communicate an existence of the refrigerant leak with an alert which is one or more of visual, audible, and vibratory.

2. The method of claim 1 wherein the first phase initiates with the controller taking the refrigeration system off line.

3. The method of claim 1, wherein the third phase concludes with the control bringing the refrigeration system on line.

4. The method according to claim 1, wherein the controller periodically performs one of the plurality of leak test cycles.

5. The method according to claim 1, wherein the controller performs the one of the plurality of leak test cycles following a non-periodic trigger event.

6. The method of claim 5 wherein the trigger event includes the controller bringing the refrigeration system off line for maintenance.

7. The method according to claim 3, wherein
the refrigeration system includes a variable speed compressor and an electronic expansion valve, and wherein the first phase starts at a time T1 and ends at a time T2 as monitored by the controller, and throughout the first phase the controller sets the compressor to minimum output and the electronic expansion valve to maximum opened, and the controller monitors pressure in at least one of the condenser and evaporator to determine when the evaporator is charged with a maximum available amount of the system refrigerant.

8. The method of claim 7, wherein
the second phase starts at the time T2 and ends at a time T3 as monitored by the controller, and throughout the second phase the controller sets the compressor to minimum output and sets the electronic expansion valve to closed, and the controller monitors pressure in at least one of the condenser and evaporator to determine when the condenser is charged with the maximum available amount of the system refrigerant.

9. The method of claim 8, wherein
the third phase starts at the time T3 and ends at a time T4 as monitored by the controller, and throughout the third phase the controller sets the compressor to no output and sets the electronic expansion valve to maximum opened, and the controller monitors pressure in at least one of the condenser and evaporator to determine when the evaporator is charged with the maximum available amount of the system refrigerant.

10. The method according to claim 9, wherein the controller monitors evaporator suction pressure to determine when the evaporator is empty of system refrigerant.

* * * * *